United States Patent
Ho et al.

(10) Patent No.: US 12,431,516 B2
(45) Date of Patent: Sep. 30, 2025

(54) FUEL CELL DEVICE

(71) Applicant: Yung-Sheng Ho, Kaohsiung (TW)

(72) Inventors: Yung-Sheng Ho, Kaohsiung (TW); Chun-I Ho, Kaohsiung (TW)

(73) Assignee: Yung-Sheng Ho, Kaohsiung (TW)

( * ) Notice: Subject to any disclaimer, the term of this patent is extended or adjusted under 35 U.S.C. 154(b) by 628 days.

(21) Appl. No.: 17/951,667

(22) Filed: Sep. 23, 2022

(65) Prior Publication Data
US 2023/0126410 A1 Apr. 27, 2023

(30) Foreign Application Priority Data

Oct. 22, 2021 (TW) ................... 110139298

(51) Int. Cl.
*H01M 8/04291* (2016.01)
(52) U.S. Cl.
CPC .............. *H01M 8/04291* (2013.01)
(58) Field of Classification Search
CPC ........... H01M 8/04291; H01M 8/0232; H01M 8/0254; H01M 8/026; H01M 8/04156; H01M 8/241; H01M 2008/1095; H01M 8/2475; H01M 8/0662; H01M 8/1097; Y02E 60/50
See application file for complete search history.

(56) References Cited

U.S. PATENT DOCUMENTS 6,544,681 B2 * 4/2003 McLean ............. H01M 8/0267
429/492

FOREIGN PATENT DOCUMENTS

WO WO-0148852 A1 * 7/2006 ............ H01M 8/026

* cited by examiner

*Primary Examiner* — Ula C Ruddock
*Assistant Examiner* — Sarika Gupta
(74) *Attorney, Agent, or Firm* — MUNCY, GEISSLER, OLDS & LOWE, P.C.

(57) ABSTRACT

A fuel cell device includes a housing defining an inner space, a runner plate disposed in the inner space, two electrode plates disposed in the inner space such that the runner plate is stacked on and in contact with one of the electrode plates, and a proton exchange membrane clamped between the electrode plates. The runner plate includes a plurality of straight sections arranged in two rows, and a plurality of connecting sections. Each two adjacent straight sections define an opening therebetween. The openings in the two rows are staggered with respect to each other. Each two adjacent connecting sections are connected to and cooperate with a common straight section to define a drain channel communicating with the opening that aligns with the common straight section.

7 Claims, 8 Drawing Sheets

FUEL CELL DEVICE

CROSS-REFERENCE TO RELATED APPLICATION

This application claims priority to Taiwanese Invention Patent Application No. 110139298, filed on Oct. 22, 2021.

FIELD

The disclosure relates to a battery, and more particularly to a fuel cell device.

BACKGROUND

A fuel cell is a device that generates electricity through hydrogen-containing fuel and air. The current mainstream technology is to use a proton exchange membrane. After the hydrogen is introduced into the anode, it is decomposed into hydrogen ions and electrons, and the hydrogen ions will then combine with the oxygen molecules of the cathode to produce water. Because the fuel cell will continue to produce water during continuous operation, to ensure continuous introduction of fuel gas, and the contact and reaction between the proton exchange membrane and the electrode will not be hindered by the water, a mechanism for continuously draining the generated water must be properly designed in order to maintain the normal operation of the fuel cell.

Accordingly, currently existing fuel cells are designed with flow channels on the electrode plates so as to achieve the purpose of draining the generated water. However, in response to the trend of increasing power consumption of various electrical equipment nowadays, the fuel cells are typically configured densely to generate as much power as possible in a limited space. When multiple fuel cells are densely arranged, a layer-by-layer squeezing situation may possibly occur between the structures. If the electrode plate designed with flow channels is squeezed, not only may it not be in contact with the proton exchange membrane as expected, but also the generated water may not be able to be drained smoothly. Thus, how to maintain the normal operation of the fuel cell in response to the current trend of large power consumption, while taking into account the smooth drainage of water, has become a topic that practitioners in related fields are eager to break through.

SUMMARY

Therefore, an object of the present disclosure is to provide a fuel cell device that can alleviate at least one of the drawbacks of the prior art.

Accordingly, a fuel cell device of this disclosure includes a housing, a runner plate, two spaced-apart electrode plates, and a proton exchange membrane clamped between the electrode plates. The housing includes a housing body defining an inner space, two air guide tubes communicating with the inner space and suitable for respectively introducing hydrogen and oxygen into the inner space, and a drain pipe communicating with the inner space and suitable for draining water in the inner space.

The runner plate is disposed in the inner space and includes a plurality of straight sections arranged in two rows which are spaced apart in a first direction, and a plurality of connecting sections each of which is connected between one end of one of the straight sections of one of the two rows and one end of a corresponding straight section of the other row. The straight sections of each row extend in a second direction transverse to the first direction and are spaced apart from each other in a third direction transverse to the first and second directions. Each two adjacent ones of the straight sections of each row define an opening therebetween. The openings in the two rows of the straight sections are staggered with respect to each other. Each straight section has a width extending in the third direction greater than a width of each opening extending in the third direction, and has a plurality of penetrating holes spaced apart from each other along a length of a corresponding straight section.

Each two adjacent ones of the connecting sections are connected to and cooperate with a common straight section to define a drain channel extending in the second direction and communicating with the opening that aligns with the common straight section. The electrode plates are disposed in the inner space such that the runner plate is stacked on and in contact with one of the electrode plates.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
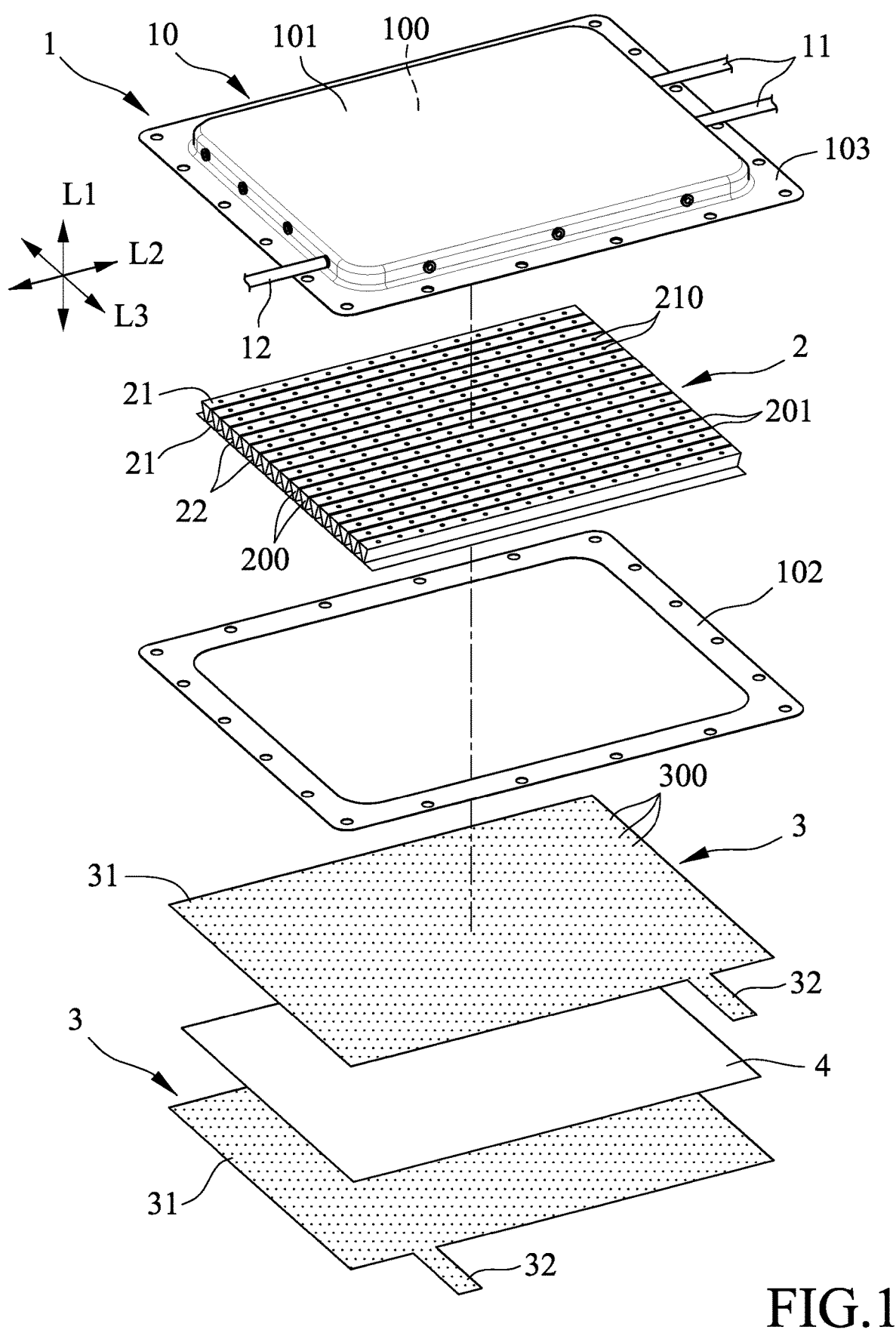
FIG. 1 is an exploded perspective view of a fuel cell device according to the first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
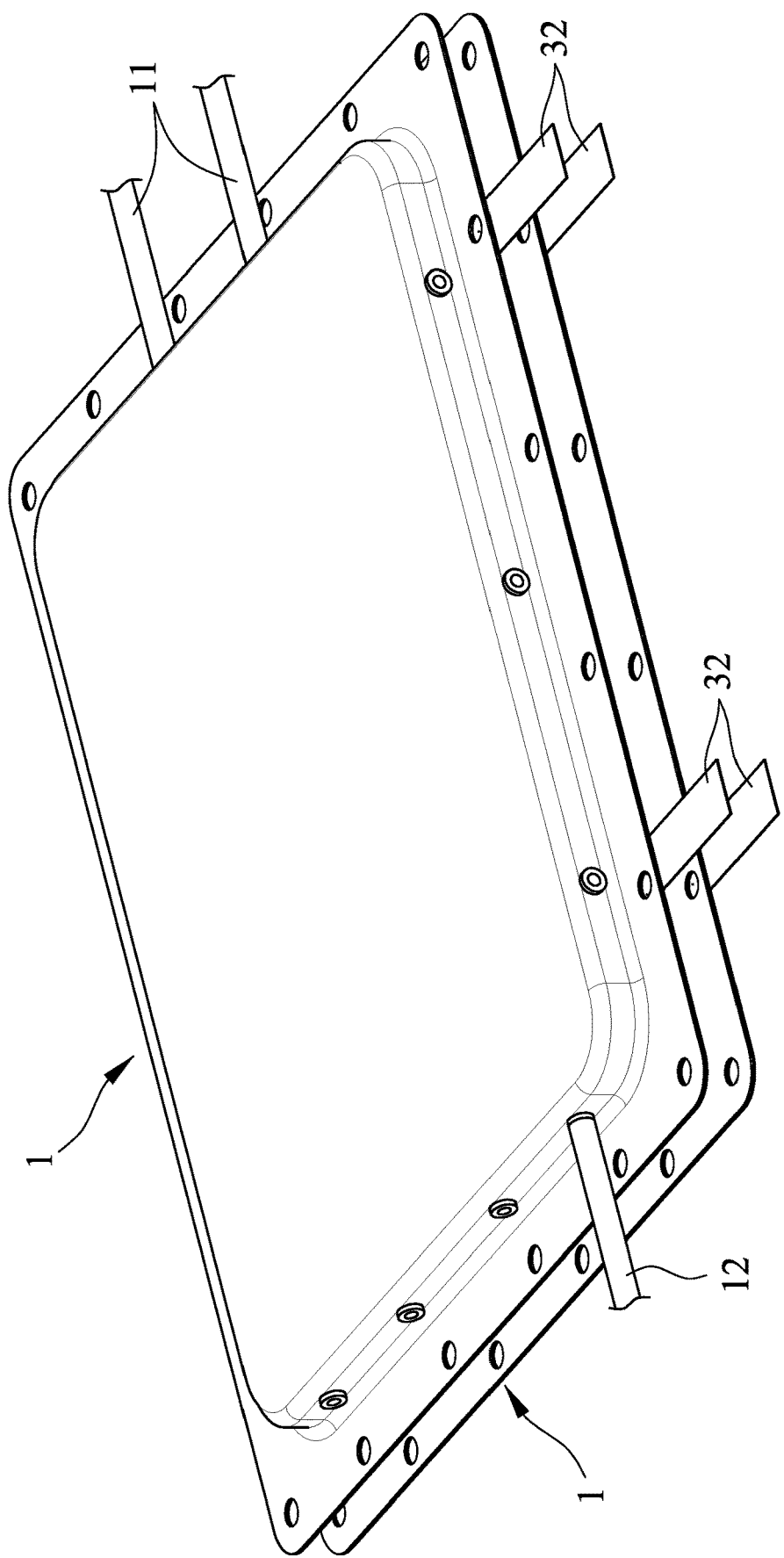
FIG. 2 is a schematic view illustrating how two fuel cell devices of the first embodiment can be stacked on each other.

Referring to FIG. 1, a fuel cell device according to the first embodiment of the present disclosure includes a housing 1 defining an inner space 100, a runner plate 2 disposed in the inner space 100, two spaced-apart electrode plates 3, and a proton exchange membrane 4 clamped between the electrode plates 3. It should be noted herein that the first embodiment is described in the form of one basic unit. In actual use, two basic units can be stacked on each other, as shown in FIG. 2, or even more basic units, to meet the required power supply, and is not limited to operating and using only one basic unit of the first embodiment. Further, the principle of generating electricity and by-product water through the proton exchange membrane 4 after the introduction of hydrogen and oxygen is not the technical focus of this disclosure, so it will not be repeated in the below description.

The housing 1 includes a housing body 10 defining the inner space 100, two spaced-apart air guide tubes 11, and a drain pipe 12. Specifically, the housing body 10 has a peripheral flange 103, a cover portion 101 extending upwardly from an inner periphery of the peripheral flange 103, and a frame portion 102 connected to the peripheral flange 103 for limiting the runner plate 2 in the inner space 100. The air guide tubes 11 are connected to the cover portion 101, communicate with the inner space 100, and are suitable for respectively introducing hydrogen and oxygen into the inner space 100. The drain pipe 12 is connected to the cover portion 101 opposite to the air guide tubes 11, communicates with the inner space 100, and is suitable for draining water produced in the inner space 100 during operation of the first embodiment. It is emphasized herein that the specific shape of the housing body 10 is not limited to what is disclosed herein, as long as it can define a space for accommodating the runner plate 2, the electrode plates 3 and the proton exchange membrane 4, any shape of the housing body 10 is acceptable. Further, the air guide tubes 11 can be respectively connected to a hydrogen source and an oxygen source, and the drain pipe 12 can be connected downstream of a water storage or drainage equipment.

Figure 3:
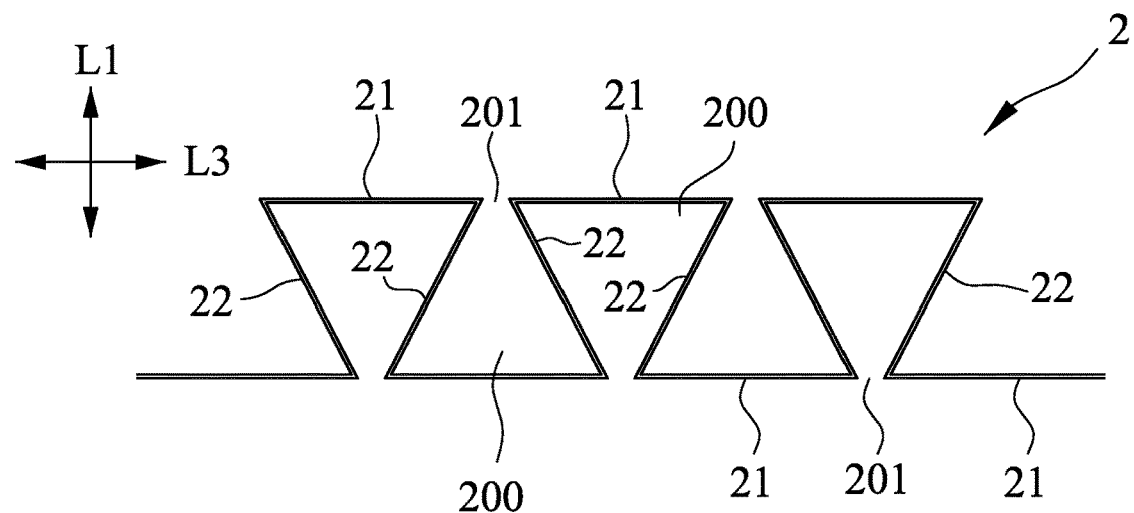
FIG. 3 is an enlarged side view of a portion of a runner plate of the first embodiment.
Figure 4:
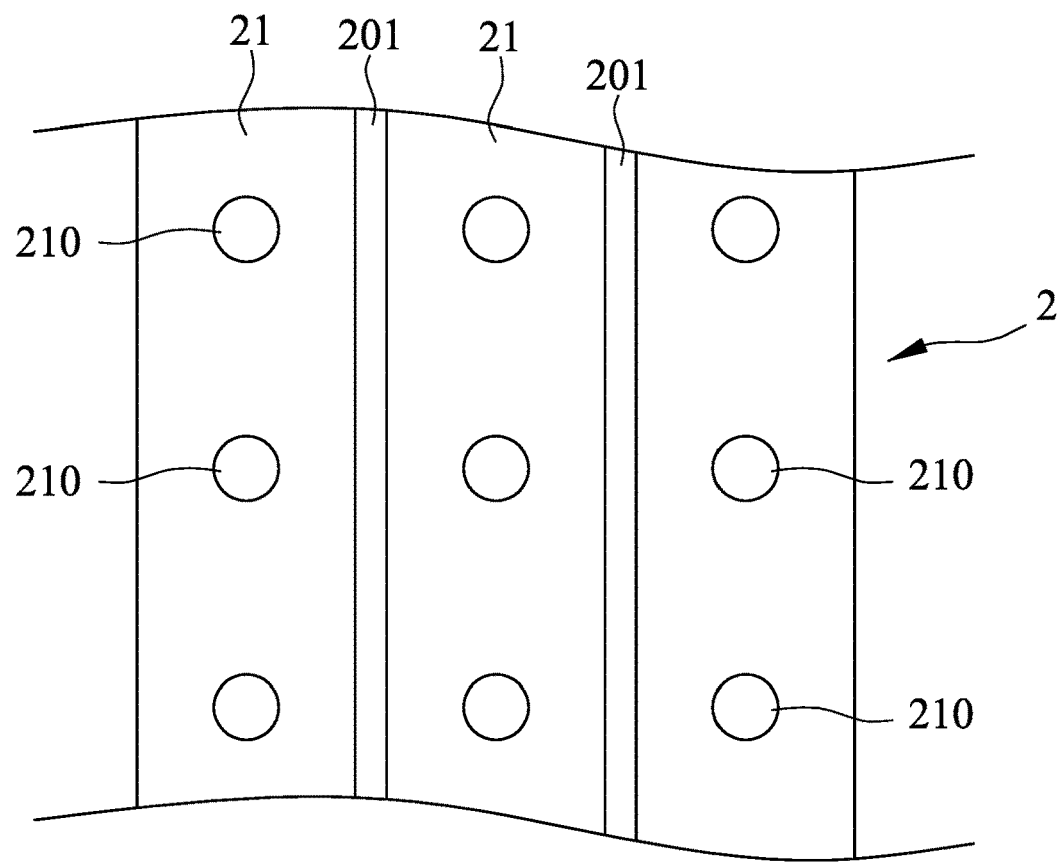
FIG. 4 is a fragmentary enlarged top view of the runner plate of the first embodiment.

Referring to FIGS. 3 and 4, in combination with FIG. 1, the runner plate 2 includes a plurality of straight sections 21 arranged in two rows which are spaced apart in a first direction (L1), and a plurality of connecting sections 22 each of which is connected between one end of one of the straight sections 21 of one of the rows and one end of a corresponding one of the straight sections 21 of the other row. The straight sections 21 of each row extend in a second direction (L2) transverse to the first direction (L1), and are spaced apart from each other in a third direction (L3) transverse to the first and second directions (L1, L2). Each two adjacent ones of the straight sections 21 of each row define an opening 201 therebetween. The openings 201 in the two rows of the straight sections 21 are staggered with respect to each other. That is, each straight section 21 is aligned with a corresponding one of the openings 201 in the other row of the straight sections 21 in the first direction (L1).

Each straight section 21 has a width extending in the third direction (L3) greater than a width of each opening 21 extending in the third direction (L3). Each two adjacent ones of the connecting sections 22 are connected to and cooperate with a common straight section 21 to define a drain channel 200 extending in the second direction (L2) and having a generally triangular cross section in the third direction (L3). The drain channel 200 communicates with the opening 201 that aligns with the common straight section 21 in the first direction (L1).

Figure 5:
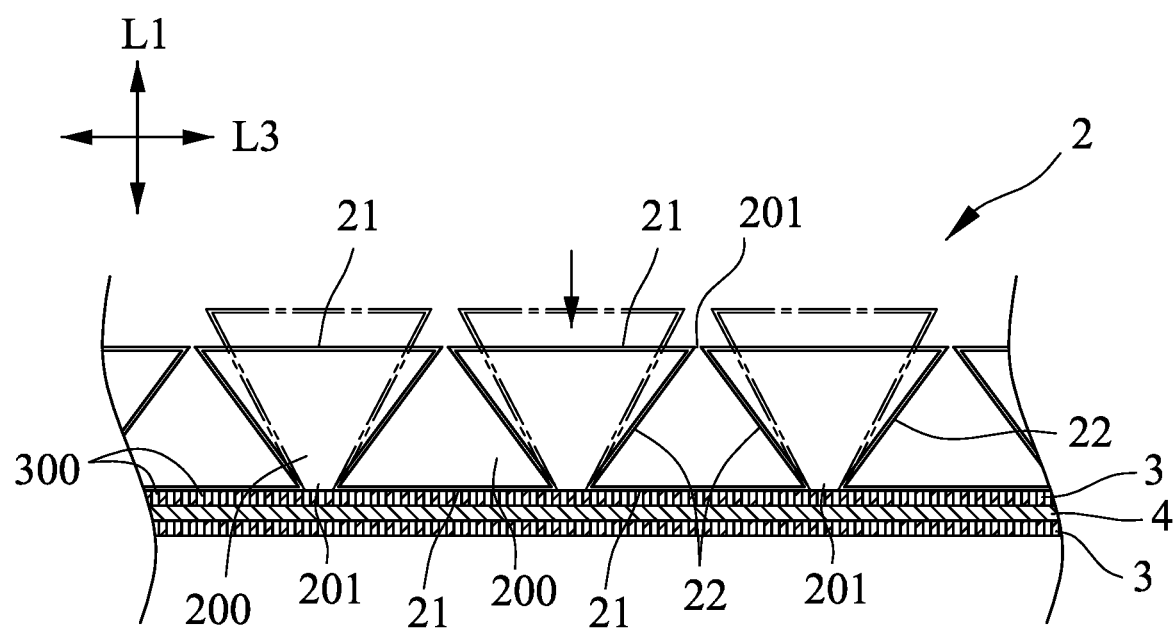
FIG. 5 is a schematic view illustrating how the runner plate of the first embodiment is deformed by an external force.

It should be noted that, because the runner plate 2 is made of a material that will moderately deform and bend after being subjected to an external force, such as a thin metal sheet, and is formed by repeatedly bending and folding the thin metal sheet, when the runner plate 2 is subjected to an external force in the first direction (L1), as shown in FIG. 5, it will moderately deform and accumulate an elastic restoring force, thereby forming a buffer mechanism. Each straight section 21 has a plurality of penetrating holes 210 spaced apart from each other along a length thereof. If the runner plate 2 is excessively deformed by the external force, even if the openings 201 are blocked, the penetrating holes 210 can still perform the function of conducting gas and discharging water.

Referring again to FIG. 1, the electrode plates 3 are disposed in the inner space 100 such that the runner plate 2 is stacked on and in contact with an upper one of the electrode plates 3. Each electrode plate 3 includes a reaction plate portion 31 in contact with the proton exchange membrane 4, and a connecting portion 32 extending outwardly from the reaction plate portion 31. The reaction plate portion 31 is formed with a plurality of micropores 300 each of which has a diameter ranging from 0.01 to 0.02 mm, preferably, 0.01 mm. As such, water mainly generated around the proton exchange membrane 4 because of the reaction to the generation of electricity can be discharged in a direction away from the proton exchange membrane 4 through the micropores 300 of the upper electrode plate 3. Furthermore, since the connecting portions 32 of the electrode plates 3 extend out of the inner space 100, and in the case where the electrode plates 3 respectively represent a cathode and an anode, an external electrical equipment can use electric power generated by the operation of the first embodiment by electrically connecting with the connecting portions 32 of the electrode plates 3.

With reference to FIG. 5, when it is necessary to use a plurality of densely arranged fuel cell devices of the first embodiment, the fuel cell devices of the first embodiments are usually stacked in the first direction (L1). When the runner plate 2 is superimposed on the electrode plates 3, it will be subjected to an external force in the first direction (L1). At this time, since the width of each straight section 21 of the runner plate 2 extending in the third direction (L3) is greater than the width of each opening 21 extending in the third direction (L3), the connecting sections 22 are inclined relative to the straight sections 21, so that the runner plate 2 as a whole has a deformation allowance in the first direction (L1), and thus can produce a buffering effect.

In addition, deformation can also occur at junctions of the straight sections 21 and the connecting sections 22 due to the material. Therefore, when an external force in the first direction (L1) is applied to the runner plate 2, adjacent straight sections 21 will be moved closer to each other in the third direction (L3), and the openings 201 will be narrowed. At this time, the connecting sections 22 can form a support in the first direction (L1). Without affecting the overall structural strength, through the characteristics of the narrowing of the openings 201 due to deformation, the straight sections 21 that are in contact with the upper electrode plate 3 can push the upper electrode plate 3 to contact the proton exchange membrane 4 so as to ensure that the reaction plate portion 31 of the upper electrode plate 3 can have a large area in contact with the proton exchange membrane 4, thereby optimizing the power generation efficiency of the first embodiment.

It should be noted that, if more fuel cell devices of the first embodiment stacked on each other are used, regardless of the weight factor or the tightness of locking, each fuel cell device of the first embodiment will be subjected to a larger external force in the first direction (L1). When the external force is larger, the deformation of the runner plate 2 also becomes larger, so that the adjacent straight sections 21 may move close and abut against each other in the third direction (L3) nearly closing the openings 201. At this time, even if the introduced gases are difficult to circulate through the openings 201, the introduced gases can still circulate through the penetrating holes 210 in the straight sections 21 (see FIG. 1 or FIG. 4), and contact the proton exchange membrane 4 through the micropores 300 of the electrode plate 3, thereby ensuring the normal operation of the first embodiment.

Figure 6:
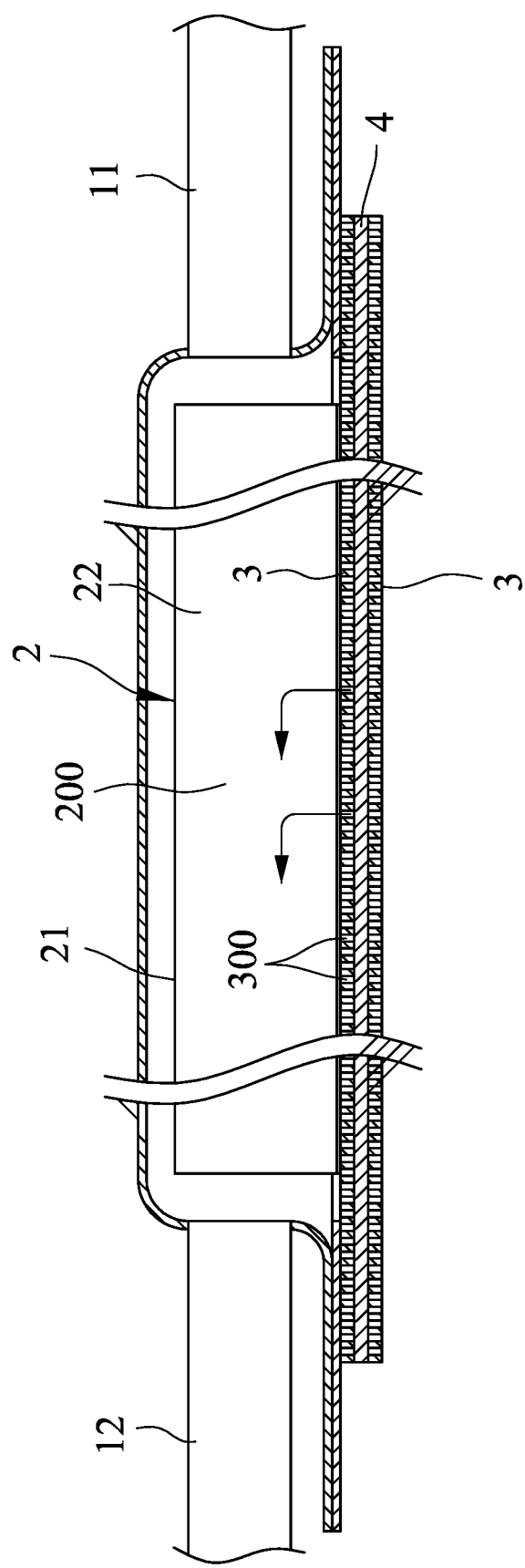
FIG. 6 is an assembled schematic view of the first embodiment, illustrating how water produced during operation of the first embodiment can be discharged through the runner plate.

Referring to FIG. 6, in combination with FIG. 5, when the first embodiment is operated to generate electricity, water produced therefrom can permeate through the micropores 300 of the upper electrode plate 3. Due to the supporting force provided by the connecting sections 22 of the runner plate 2, the space of the drain channels 200 can still be maintained even if a large external force is received by the runner plate 2, so that the produced water can be smoothly and continuously discharged to the outside through the drain pipe 12, thereby preventing accumulation of water which can affect the normal operation of the first embodiment.

Figure 7:
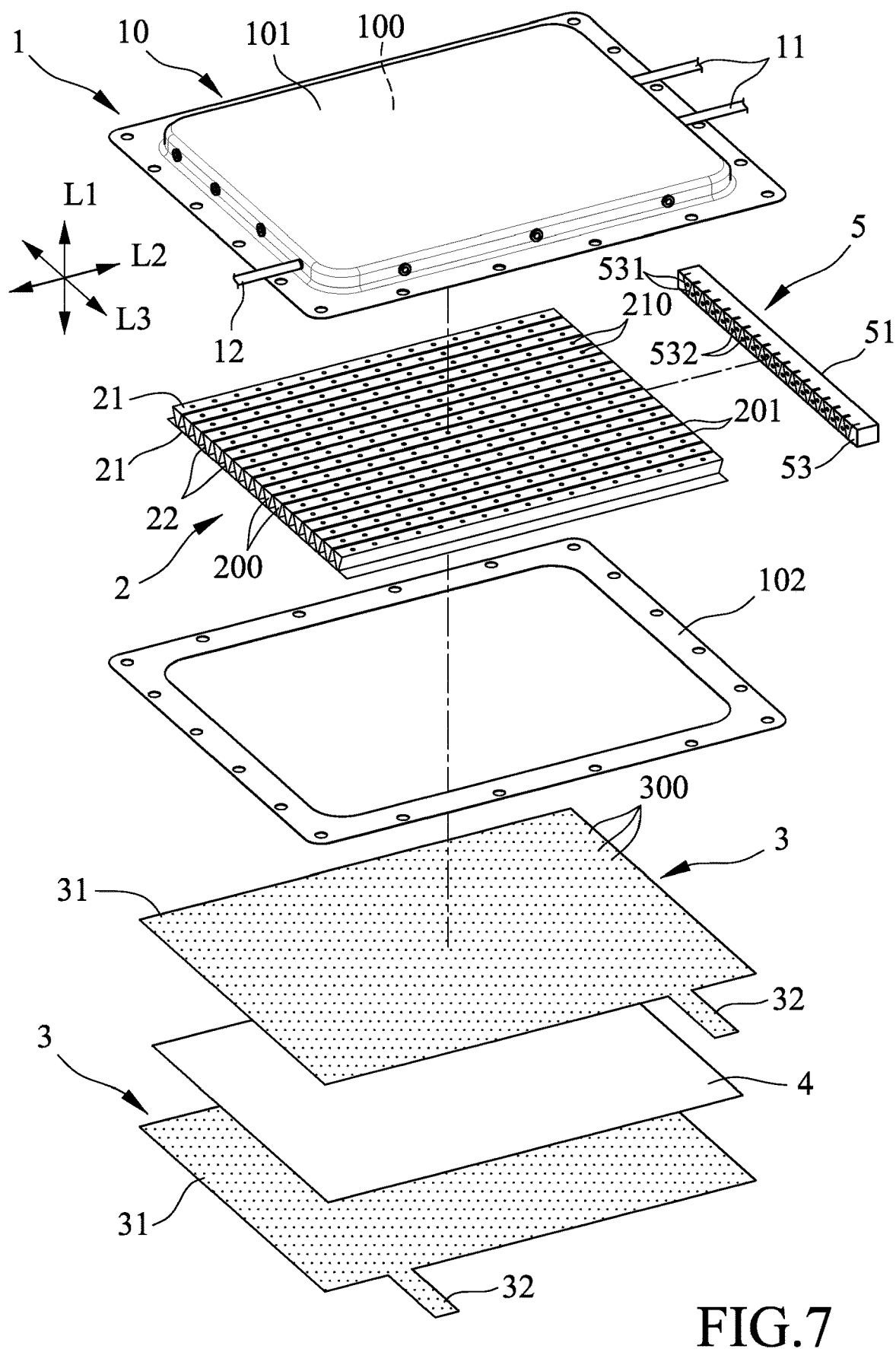
FIG. 7 is an exploded perspective view of a fuel cell device according to the second embodiment of the present disclosure.
Figure 8:
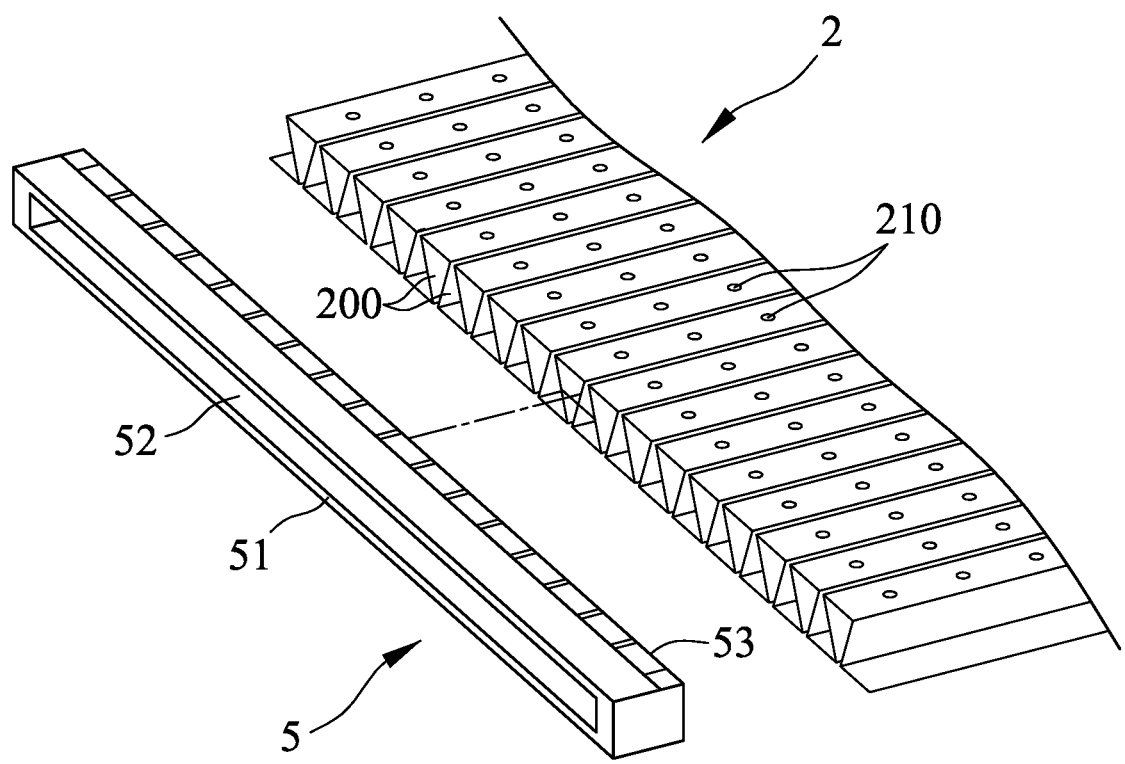
FIG. 8 is an exploded perspective view of a runner plate and a flow guide module of the second embodiment.
Figure 9:
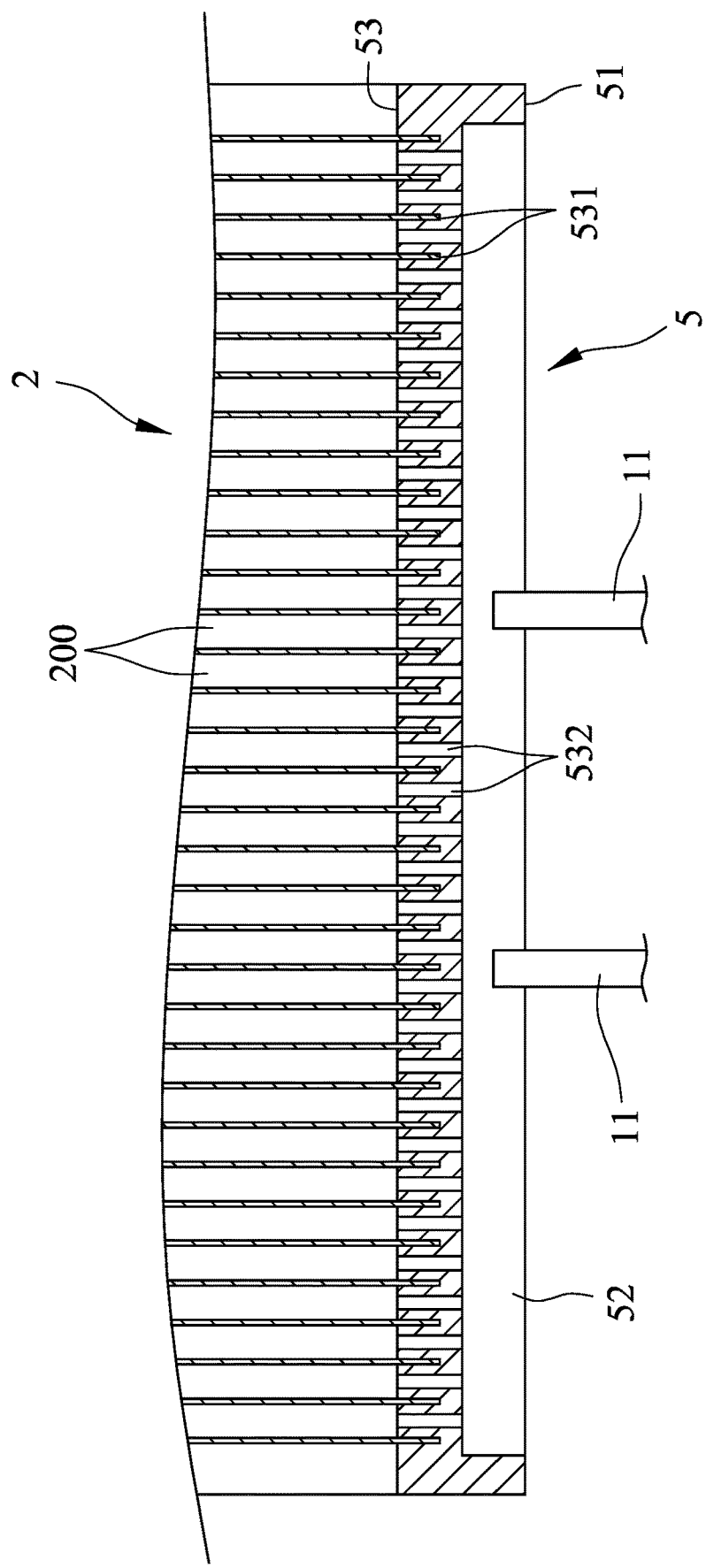
FIG. 9 is an enlarged assembled sectional view of the flow guide module and the runner plate of the second embodiment.

Referring to FIGS. 7 to 9, a fuel cell device according to the second embodiment of the present disclosure is shown to be identical to the first embodiment, but differs in that, the fuel cell device of the second embodiment further includes a flow guide module 5 connected to one end of the runner plate 2 facing the air guide tubes 11. To prevent the flow guide module 5 from affecting the reaction of hydrogen and oxygen, the flow guide module 5 is made of a material that will not react chemically with hydrogen or oxygen, preferably aluminum metal or polypropylene (PP). The flow guide module 5 is elongated, and includes an outer side surface 51 opposite to the runner plate 2, a buffer groove 52 extending inwardly from the outer side surface 51 for extension of the air guide tubes 11 therein, and a connecting surface 53 opposite to the outer side surface 51. The connecting surface 53 has a shape corresponding to a shape of the one end of the runner plate 2, and includes a plurality of spaced-apart insertion grooves 531 for insertion of the one end of the runner plate 2 therein, and a plurality of spaced-apart air inlet holes 532 located at positions respectively corresponding to the drain channels 200 and communicating with the buffer groove 52.

With reference to FIG. 9, in combination with FIGS. 7 and 8, hydrogen and oxygen respectively introduced by the air guide tubes 11 will first enter the buffer groove 52 and mix uniformly, after which they will separately enter the drain channels 200 through the air inlet holes 532 to conduct reaction. When hydrogen and oxygen to be reacted enter the drain channels 200 and contact the proton exchange membrane 4 through the openings 201 and the penetrating holes 210, they are already uniformly mixed, so that the reaction efficiency thereof can be improved. Furthermore, when the runner plate 2 is engaged with the flow guide module 5, since the flow guide module 5 is made of a slightly elastic material so that the structure thereof has its own flexibility, it can be deformed in the first direction (L1) together with the runner plate 2. Thus, the advantageous effect of stacking as in the first embodiment can be similarly achieved using the second embodiment.

In summary, in the fuel cell device of this disclosure, through the characteristics of the runner plate 2 which can be deformed by an external force without collapsing, apart from maintaining a certain structural strength and generating a supporting force, it can further ensure smooth flow of the drain channels 200, even if a plurality of fuel cell devices of this disclosure are stacked on each other in response to dense configuration, the purpose of smoothly draining the water and preventing accumulation of the water can still be achieved, so that the fuel cell device of this disclosure can operate continuously and stably. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fuel cell device, comprising:
a housing including a housing body that defines an inner space, two air guide tubes communicating with said inner space and suitable for respectively introducing hydrogen and oxygen into said inner space, and a drain pipe communicating with said inner space and suitable for draining water in said inner space;
a runner plate disposed in said inner space and including a plurality of straight sections arranged in two rows which are spaced apart in a first direction, said straight sections of each row extending in a second direction transverse to the first direction and being spaced apart from each other in a third direction transverse to the first direction and the second direction, each two adjacent ones of said straight sections of each row defining an opening therebetween, said openings in said two rows of said straight sections being staggered with respect to each other, each of said straight sections having a width extending in the third direction greater than a width of each of said openings extending in the third direction, and having a plurality of penetrating holes spaced apart from each other along a length of a corresponding one of said straight sections, and
a plurality of connecting sections each of which is connected between one end of one of said straight sections of one of said two rows and one end of a corresponding one of said straight sections of the other one of said two rows, each two adjacent ones of said connecting sections being connected to and cooperating with a common said straight section to define a drain channel extending in the second direction and communicating with said opening that aligns with said common straight section;

two spaced-apart electrode plates disposed in said inner space such that said runner plate is stacked on and in contact with one of said electrode plates; and a proton exchange membrane clamped between said electrode plates.

2. The fuel cell device as claimed in claim 1, wherein said runner plate is made of a material that will moderately deform and bend after being subjected to an external force.

3. The fuel cell device as claimed in claim 1, wherein each of said electrode plates includes a reaction plate portion in contact with said proton exchange membrane, and a connecting portion extending outwardly from said reaction plate portion.

4. The fuel cell device as claimed in claim 1, wherein each of said electrode plates has a plurality of micropores.

5. The fuel cell device as claimed in claim 4, wherein each of said micropores has a diameter ranging from 0.01 to 0.02 mm.

6. The fuel cell device as claimed in claim 1, further comprising a flow guide module connected to one end of said runner plate facing said air guide tubes, said flow guide module including an outer side surface opposite to said runner plate;

a buffer groove extending inwardly from said outer side surface for extension of said air guide tubes therein; and a connecting surface opposite to said outer side surface and having a shape corresponding to a shape of said one end of said runner plate, said connecting surface including a plurality of spaced-apart insertion grooves for insertion of said one end of said runner plate therein, and a plurality of spaced-apart air inlet holes located at positions respectively corresponding to said drain channels and communicating with said buffer groove.

7. The fuel cell device as claimed in claim 6, wherein said flow guide module is made of a material that will not react chemically with hydrogen or oxygen.

* * * * *